United States Patent
Muehlpforte et al.

(10) Patent No.: US 6,173,597 B1
(45) Date of Patent: *Jan. 16, 2001

(54) TUBULAR PLATE

(75) Inventors: Kurt Muehlpforte; Henk Becker; Claus Fleischer, all of Buehl; Tino Boos, Baden-Baden, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/806,254

(22) Filed: Feb. 21, 1997

(30) Foreign Application Priority Data

Mar. 26, 1996 (DE) ................................. 196 11 921
Oct. 16, 1996 (DE) ................................. 196 42 672

(51) Int. Cl.$^7$ ................................. A47L 1/02; F16H 57/02
(52) U.S. Cl. ................................. 72/58; 72/61; 74/606 R; 15/250.3; 15/250.31; 296/96.17
(58) Field of Search ................................. 74/42, 606 R; 15/250.27, 250.3, 250.31; 296/96.17; 72/58, 61

(56) References Cited

U.S. PATENT DOCUMENTS

| 1,998,760 | * | 4/1935 | Hueber | 15/255 |
| 5,074,613 | * | 12/1991 | Unterborn et al. | 296/192 |
| 5,142,941 | * | 9/1992 | Amann et al. | 74/606 R |
| 5,222,706 | * | 6/1993 | Hoshino | 248/200 |
| 5,396,681 | * | 3/1995 | Hara | 15/250.31 |
| 5,441,227 | * | 8/1995 | Hayashi | 248/274 |
| 5,647,086 | * | 7/1997 | Gold | 15/250.31 |
| 5,862,968 | * | 1/1999 | Traise | 225/100 |
| 5,878,631 | * | 3/1999 | Muehlpforte et al. | 74/606 R |

FOREIGN PATENT DOCUMENTS

2920899C2    1/1981   (DE) .

OTHER PUBLICATIONS

Hans Pischel, Wiesloch/Bewaehrtes Innenhochdruck . . . /pp. 812–814/1995.
Ebbinghaus, A./Praezisions–Werkstuecke . . . /Metallumform–Technik/1990.

* cited by examiner

Primary Examiner—David Jones
(74) Attorney, Agent, or Firm—Michael J. Striker

(57) ABSTRACT

A tubular plate is formed for a wiper device as a support for at least one wiper bearing and a wiper drive, with tubular members for receiving a wiper bearing. The tubular plate is deformed without removal of a material, has tubular members for receiving the wiper drive, and the tubular members are formed on the tubular plate of one piece with it.

16 Claims, 7 Drawing Sheets

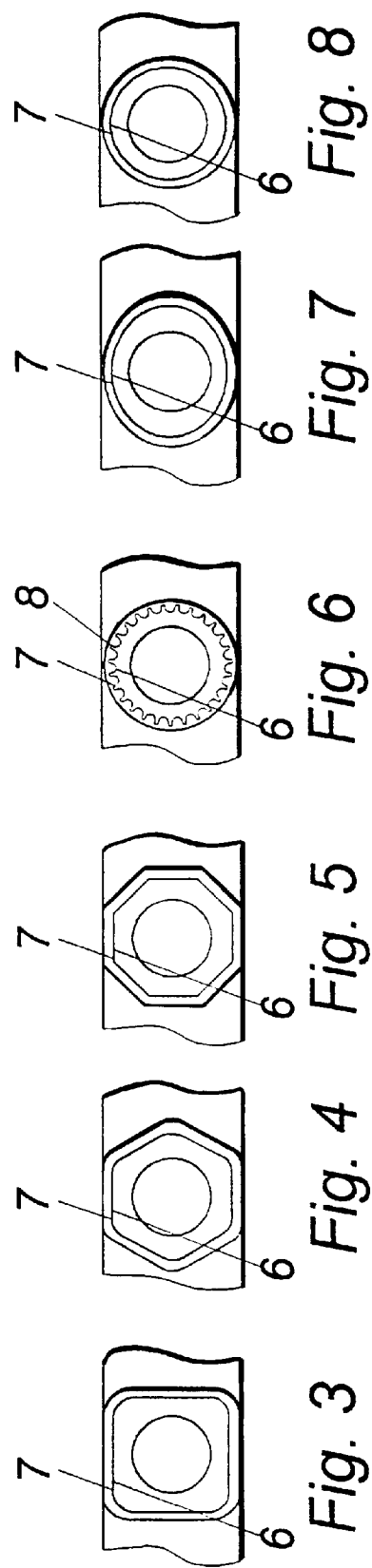

TUBULAR PLATE

BACKGROUND OF THE INVENTION

The present invention relates to a tubular plate for a wiper device as a support for at least one wiper bearing and a wiper drive.

Known wiper devices have a window wiper frame and several components mounted on it and including a wiper drive having an electric motor and a transmission, a drive shaft with a drive crank and drive rods, a wiper bearing, and driven shafts with driven cranks. The window wiper operates as a support and serves for mounting the wiper device on a chassis of a vehicle. It has numerous components, so that many manufacturing and mounting steps are needed. In order to reduce the weight of the wiper device, hollow profiles or so called tubular plates are used as supports.

Such tubular carriers disclosed for example in the German patent document DE 29 20 899 C2, in which the tubular members with corresponding projections are inserted in the hollow profile. The projections are located at least partially on the walls of the support and have at least one recess in which the portions of the support are pressed, to provide a form-locking connection between the support and the tubular members. Wiper bearings are released in the pipe. This approach reduces the number of parts when compared with the screw connection. However, the joining process still requires numerous prefabricated components with many manufacturing steps. This makes more expensive the bearing hold and logistics. Furthermore, the massive projections have a substantial weight despite the recesses.

A method of converting tubular members into work pieces is disclosed in the magazine "Werkstatt and Betrieb", Carl Hanser Verlag, Munhen, 1995, pages 812–815 and the reprint from the publication "Metallumformtechnik", Claus Dannert Verlag, 1994, under the title "Prazisions-Werkstucke in Leichtbauweise, hergestilt durch lnnenhochdruck-Umformen". This method is used first of all for vehicle industry and operates with high pressures.

The tubular element to be deformed is placed in a subdivided tool, in which the desired workpiece shape is produced. The tool which is mounted in a press is closed by a vertically operating press plunger. The tubular element ends are closed by the closing tool, through which a pressure medium is supplied to press the tubular walls against the inner tool mold. An axial pressure is applied by the horizontally operating plungers on the tube, which is superimposed with inner pressure. Thereby the material which is required for the deformation is taken not only from the wall thickness of the tubular element, but is also provided by the shortening of the tube. The closing tools are axially hollowed during the deformation.

SUMMARY OF THE INVENTION

Accordingly, it is an object of present invention to provide a tubular carrier of a wiper device and a method of producing the same, which avoids the disadvantages of the prior art.

In keeping with these objects and with others which will become apparent hereinafter, one feature of the present invention resides, briefly stated, in a tubular carrier of a wiper device which is deformed without a material removal, and the tubular members for receiving a wiper bearing are formed on the tubular carrier of one piece with it.

Thereby a substantial component of the tubular carrier is produced in one working step in a one-piece workpiece. For the wiper device, the weight, the number of components, the total number of the cutting and joining locations are reduced, and the material diversity which makes difficult a subsequent recycling process is reduced as well.

For further functions, additional shape of or tubular members can be provided. They are preferably opened, when it is needed. Thereby the tubular carrier is ready for a number of applications. The tubular members which are not needed can be closed and therefore the interior of the tubular carrier is protected from moisture and corrosion. It is also possible to produce the additional tubular members individually and when necessary to connect with the tubular carrier by plugging, clamping, screwing, welding, and so on.

The weight of the tubular carrier is very low, since the tubular members can have substantially the same small wall thickness as the remaining profile. Furthermore, by suitable profile, for example non-round cross-section, polygonal profile etc, the easy mounting, the rigidity and the vibration properties can be improved, and locally (depending on loads) different cross-sections can be utilized. With its profiles having a cross-section different from a circular shape, a form-locking connection can be produced in a peripheral direction in a simple manner.

In accordance with an embodiment of the invention, mounting elements can be formed on the ends of the tubular carrier. They can be flat or U-shaped and they can have an opening in form of a hole, elongated hole, or slot. The mounting elements are preferably deformed by pressing from an end portion of the tube and the openings are punched out after this. The above mentioned advantages can be therefore obtained to great extent.

With long tubular carriers and heavy mounting elements, it can be advantageous to provide an additional supporting and mounting element between the ends of the tubular plate. It can engage directly on the tubular plate by screwing or welding or plugging or clamping in a corresponding receiving seat. The receiving seat can be arranged in a tubular member. Furthermore, the additional supporting and mounting element can be supported indirectly on the tubular plate by its connection in a similar manner with a projecting housing part of the wiper device.

The inventive tubular plate can be used for heavy mounting conditions. In correspondence with the spacial peculiarities, it can be curved in one or several planes once or many times.

The inner high pressure process is suitable in advantageous manner for manufacture of the tubular plate. In this process a subdivided tool mold receives a tubular member and is closed. Sealing tools close the tube ends and are preferably displaced axially, while simultaneously an axial pressure is applied on the tube end. Therefore uniform wall thickness and precise contours are obtained, which need no or only little mechanical post-working. The method allows a flexible shaping, so that the inventive tubular plate can be easily produced in a complex version with many curvatures in several planes.

A zinc-plated steel tube with a low strength or a tube of an aluminum alloy are especially suitable for the process. They are sufficiently flowable and corrosion-resistant and do not require post-treatment. The aluminum alloys have further weight advantages. A seamless as well as longitudinally welded tube can be utilized.

The novel features which are considered as characteristic for the present invention are set forth in particular in the appended claims. The invention itself, however, both as to its construction and its method of operation, together with additional objects and advantages thereof, will be best

BRIEF DESCRIPTION OF THE DRAWINGS

FIGS. 2–4 are views showing the embodiments of a shape mounting element in a partial section in direction of the arrow II in FIG. 1;

FIG. 5 is a view showing a partial section of a variant of FIG. 4 in direction of the arrow V in FIG. 4;

FIGS. 6–9 are partial views in direction of the arrow VI in FIG. 1 of a tubular members with different cross-sectional profiles;

DESCRIPTION OF PREFERRED EMBODIMENTS

Figure 1:
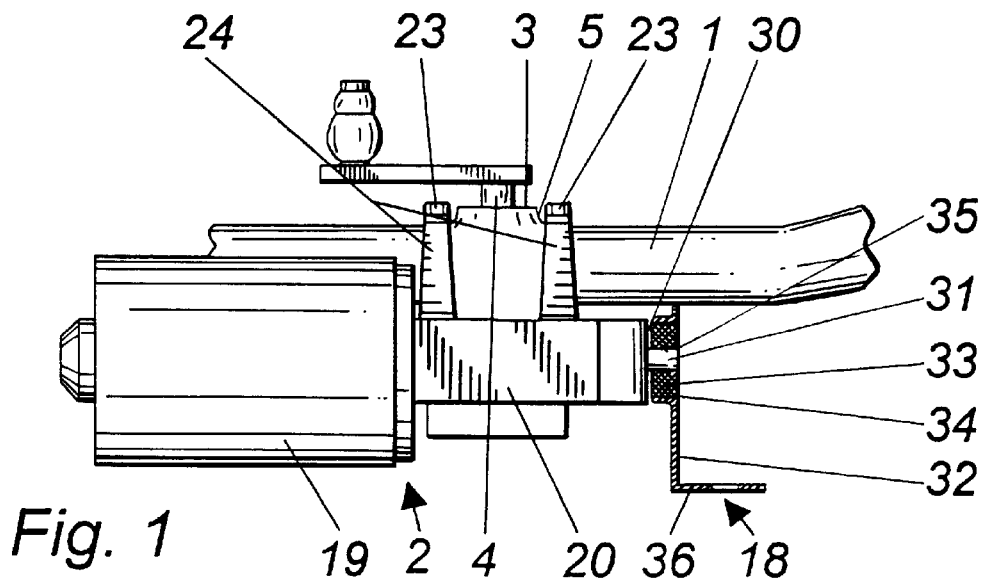
FIG. 1 is view showing a wiper device with a tubular carrier in accordance with the present invention with drive rods.

A wiper device shown in FIG. 1 has a tubular carrier 1 which mounts on a not shown vehicle chassis through mounting elements 13 the individual components of the wiper device, including a wiper drive with an electric motor 6 and a transmission 7, and a drive shaft 8 with driving cranks 9, and driven shafts 2 with driving cranks 10. The driving cranks 9 and the driving cranks 10 are connected drivingly by a not shown drive rods which engage a double hinge ball 11 on the driving crank 9 and further hinge balls 12 on the driven cranks 10. Not shown wiper arms are plugged and mounted on the free ends of the driven shafts 2 which are outwardly guided from the vehicle chassis. The driven shaft 2 is axially secured by ascending disks 5.

Figure 2:
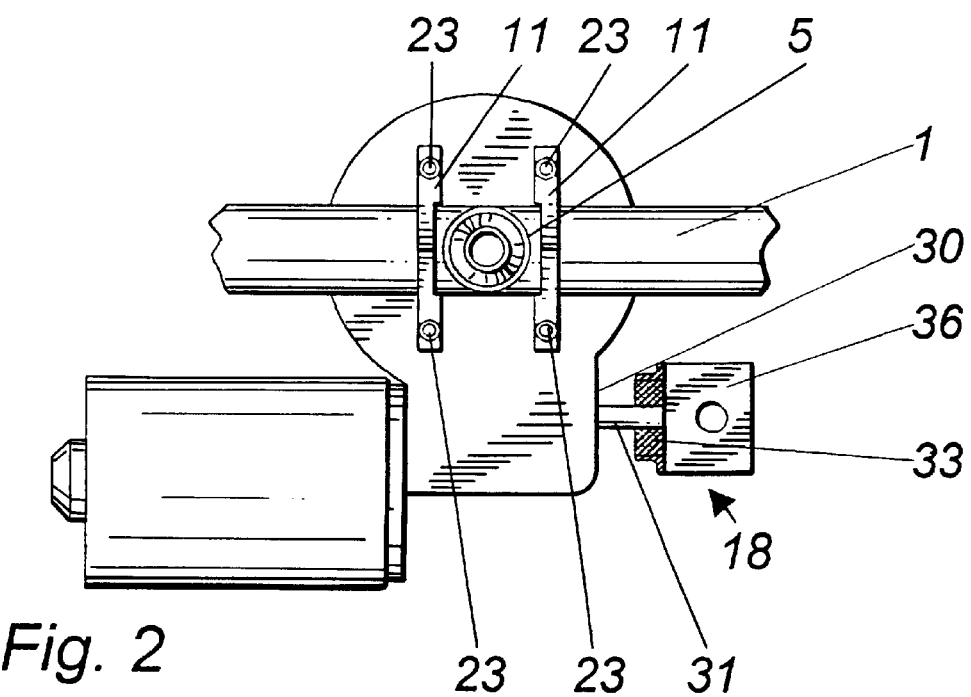

The tubular carrier 1 is produced from a tubular element and has in the region of its ends two opposite, molded tubular members 3 for receiving bearing bushings 4 in which the driven shafts are supported. The mounting elements 13 close the ends of the tubular carrier 1 and are shaped by deforming the tubular ends. They have a flat or U-shaped profile and are provided with openings formed as holes 14 shown in FIG. 1, longitudinal holes 15 shown in FIG. 2, or slots 16 shown in FIGS. 4 and 5, through which not shown mounting screws are inserted. The longitudinal holes 15 and the slots 16 are suitable for compensation of length tolerances.

In the embodiment of FIGS. 4 and 5, the mounting element 13 has laterally of the slots 16 legs 17 which form a U-shaped profile, and the mounting element 13 is connected to the tubular members 3 for the wiper bearing in form-resistant and bending resistant manner. If the tubular carrier 1 is produced in a deformation process, for example with inner high pressure, the mounting element 13 can be produced in the same working station by pressing, edging and punching.

The wiper drive is also held in the tubular carrier 1 by two opposite, molded tubular members 18 in a housing projection, for example a bearing housing 35 of the drive, by which a tubular carrier 1 is guided and held in the tubular member 18. Therefore only one component, mainly the tubular carrier 1, is needed for receiving the wiper bearing and for holding the wiper drive. Thereby the total number of the components and the cutting locations is substantially reduced.

The hollow profile of the tubular carrier provide a form- and bearing-resistant construction. It can be further improved by a special profiling of the tubular carrier 1 and/or the tubular members 3 and 18. The profiling improves, in addition to the rigidity, the mounting by favorable supporting surfaces as well as the vibration conditions. These advantages can be used especially well when the profile is determined spacially differently on the loads. Furthermore, by profiling with a cross-section which is different from the circular shape, a form lock can be obtained for receiving the torques in a simple manner.

Figure 9:
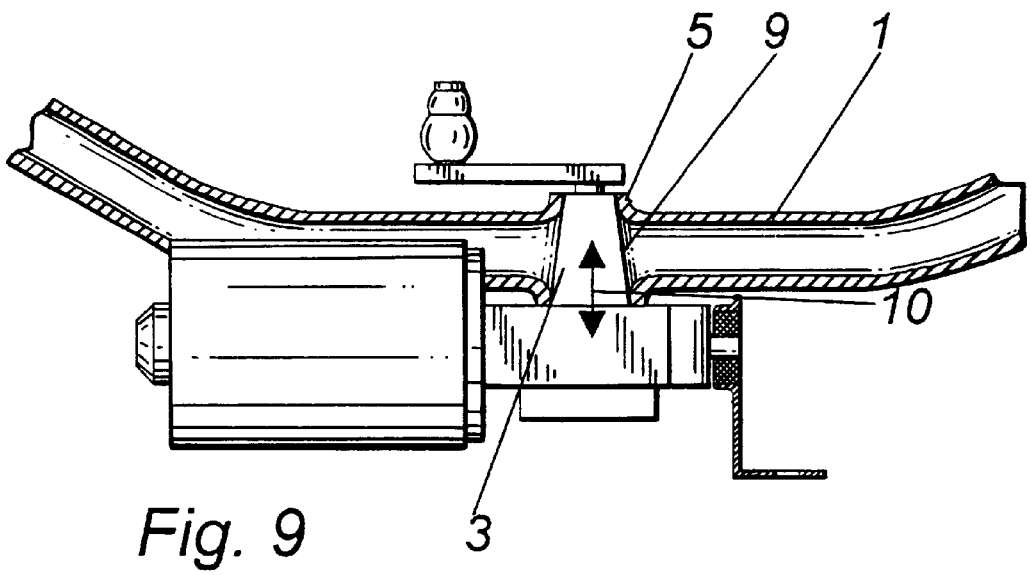

FIGS. 7–9 show polygonal profiles, for example on a rectangular tubular member 21, a hexagonal tubular member 22, and an octagonal tubular member 23. The cross-section of the tubular carrier 1 can be profiled identically or similarly, depending on its loading and spacial requirements.

The tubular carrier 1 can be provided for special functions with additional tubular members 19, which when needed are mounted on the tubular carrier 1, for example by screwing, clamping, welding. Thereby the application region of the tubular carrier 1 is simply expanded. The additional tubular members 19 can be formed, as the remaining tubular members 3 and 18, in the inner high pressure process. Thereby the tubular carrier 1 is prepared for several different application cases. In this case, the additional tubular members 19 are first opened when needed, to prevent penetration of moisture in the tubular carrier 1 and corroding of its interior.

As a rule, the mounting elements 13 project at the ends of the tubular carrier 1 for stable mounting. For long or heavy wiper devices or in special application cases, a further support must be advisable. For this purpose, an additional support 24 is provided and can be mounted by plugging, clamping, screwing, etc. on the tubular carrier 1. It can be supported through a damping element 25 on the vehicle chassis. The mounting hole 26 for a screw is provided.

Figure 10:
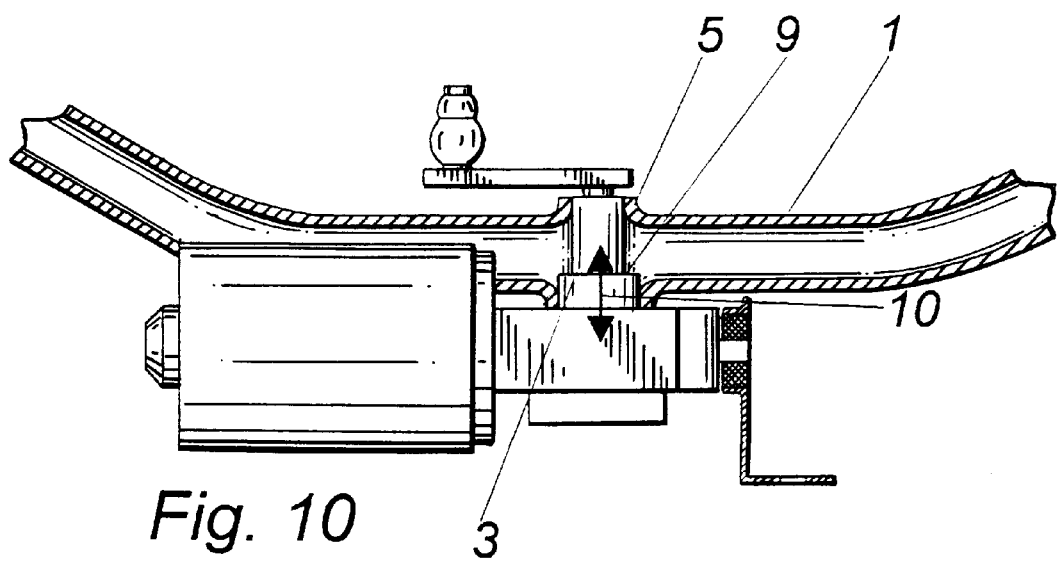
FIG. 10 is a view showing a partial section of a wiper drive with a support of a transmission.

The tubular carrier 1 can be supported indirectly via the wiper drive. In particular, a support 29 engages with a damping element 25 on a housing projection 27 of the electric motor 6 or the transmission 7. A mounting hole 30 serves also for mounting on the vehicle chassis as shown in FIGS. 10 and 11.

Figures 11, 12:
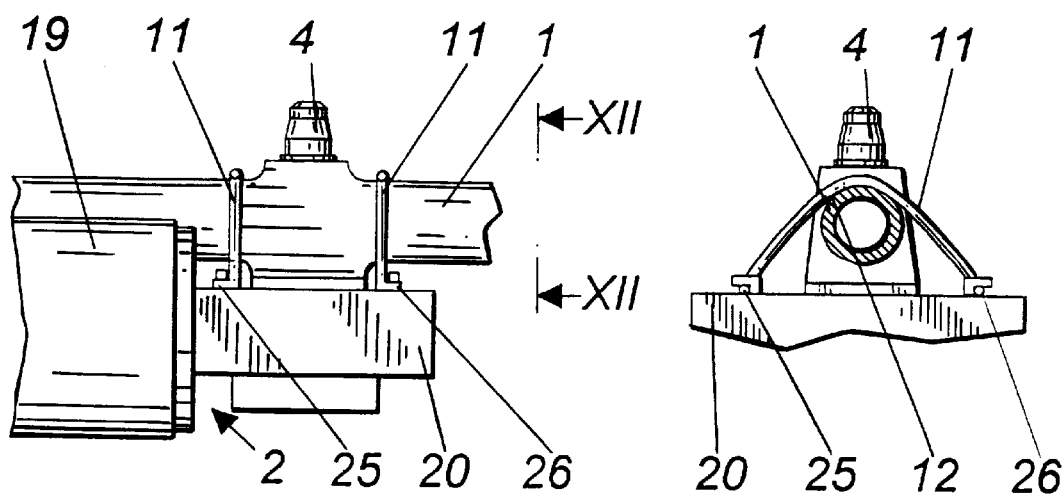
FIG. 11 is a partial view of a wiper drive of FIG. 10 from above with a section through the support in correspondence with the line XI—XI in FIG. 10.
FIG. 12 is a partial view of a wiper drive with a support between the transmission and the tubular carrier.
Figure 13:
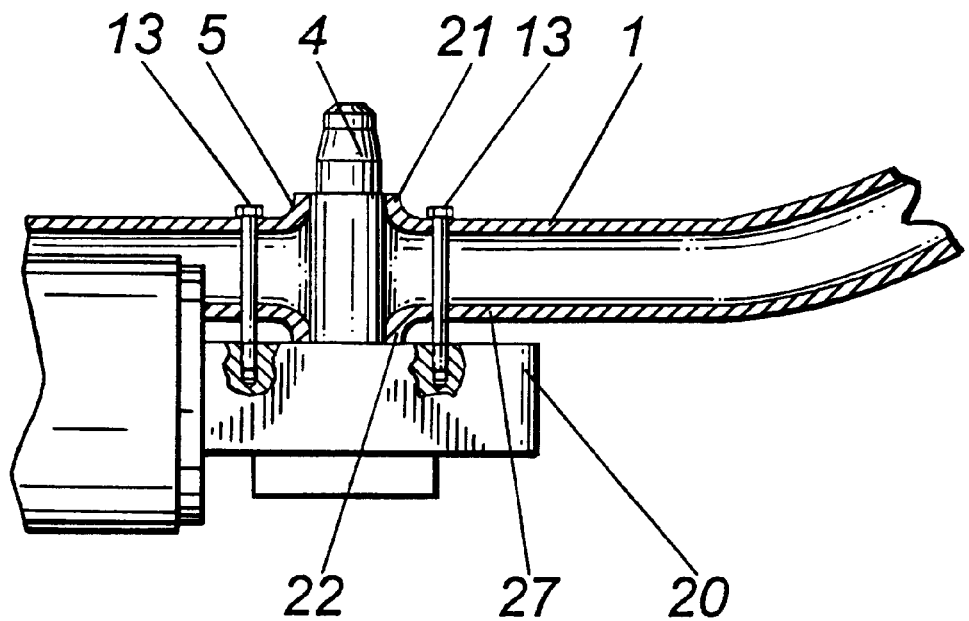
FIG. 13 is a partial view of a wiper drive of FIG. 12 from above with a section through the support in correspondence with the line XIII—XIII in FIG. 12.

Such a housing projection, as shown in FIGS. 12 and 13, can be also formed by a bearing housing 33 of the transmission 7. In this case a support 31 surrounds the bearing housing 35 between the transmission 7 and the tubular carrier 1. A further damping element 32 and a mounting hole 33 serves for mounting on the vehicle chassis.

When required by the mounting space, geometry or kinematics the wiper drive can be mounted on the tubular carrier by an additional mounting element, formed for example as a holding plate or a similar element.

Figure 14:
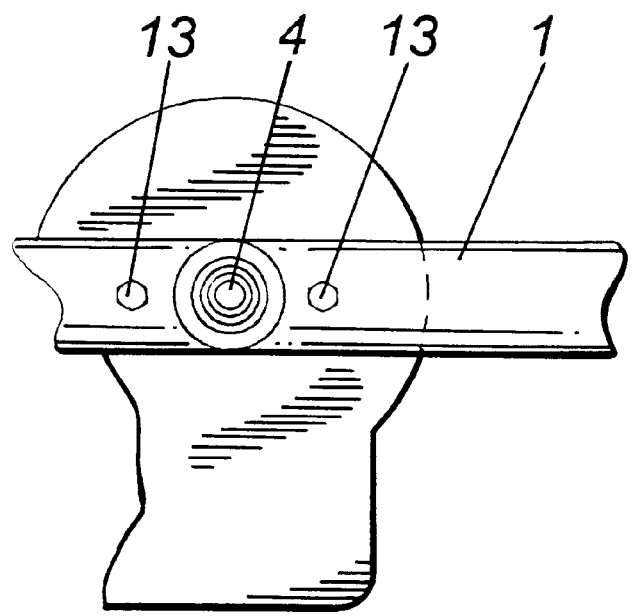
FIG. 14 is a schematic view of a tubular carrier which is bent many times.
Figure 15:
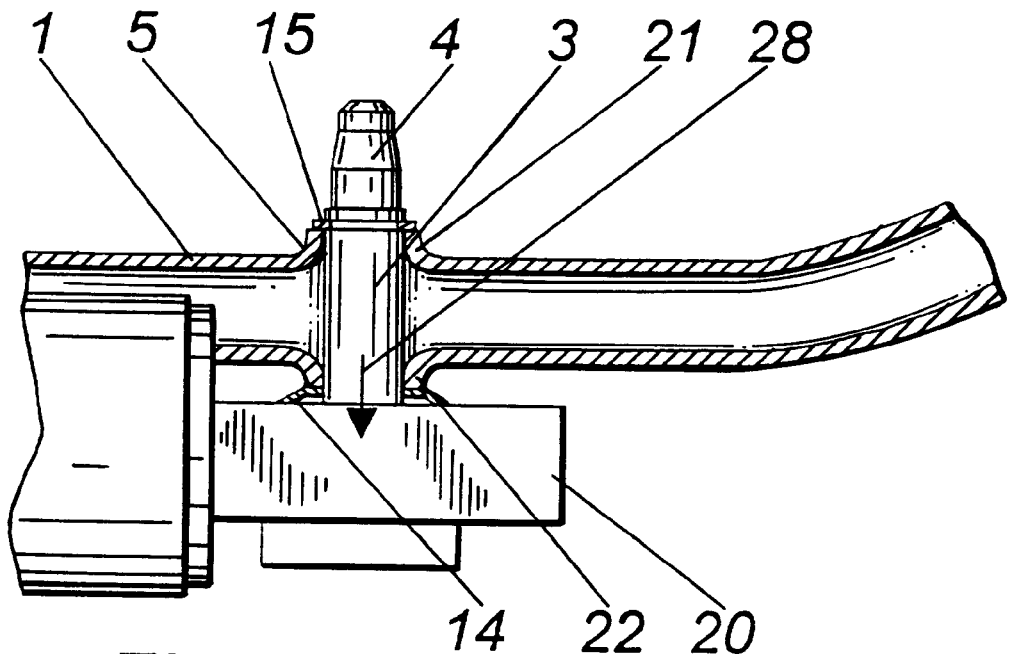
FIGS. 15–17 are schematic views corresponding to the direction of the arrow XV in FIG. 14 of different variants of the tubular carrier.
Figure 16:
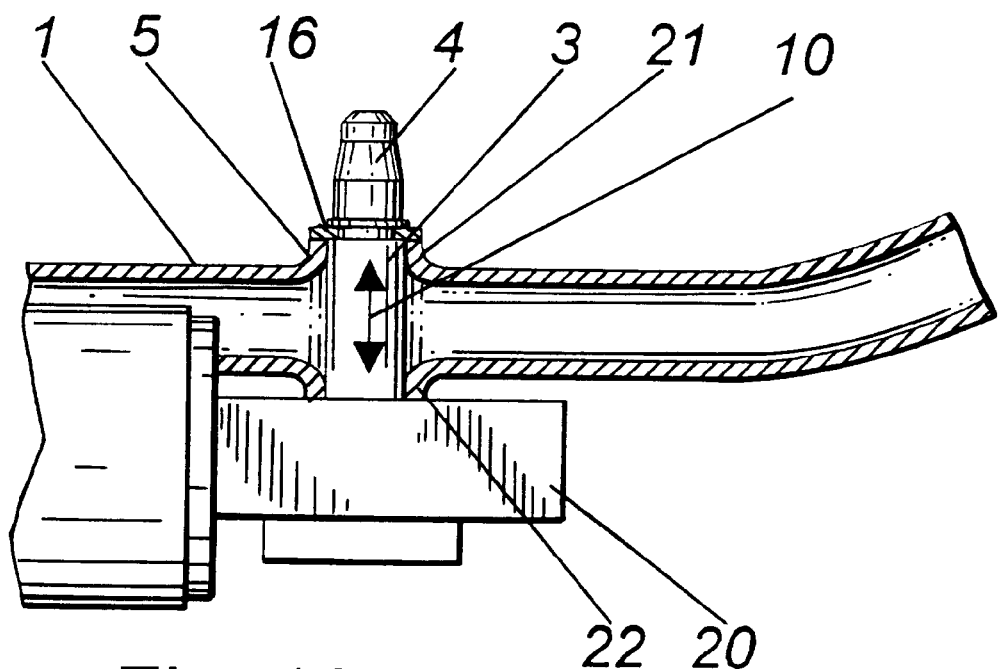
Figure 17:
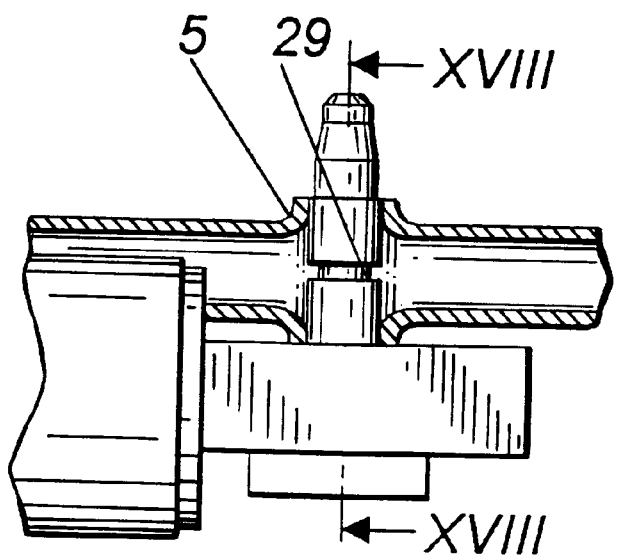

Methods of shaping without removal of a material, such as for example the inner high pressure methods or injection molding methods can be used to provide complex shape. Thereby the tubular carrier 1 can be adjusted to complicated mounting conditions, by curving once or many times in one or several planes. FIG. 14 shows a tubular carrier 1 which is curved many times, while in the variant 36 in FIG. 15 it is curved only in one plane. FIG. 16 shows a variant 37 in which one end is offset parallel in one plane to the central part and another end of the tubular carrier 37. In the variant 38 of the tubular carrier shown in FIG. 17 both ends are located in a plane which is offset parallel to the central part.

Figure 18:
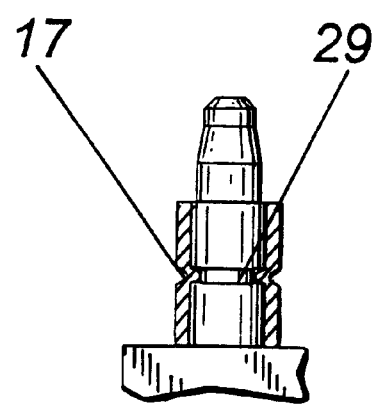
FIG. 18 is a view showing a schematic cross-section through a tube for producing a tubular carrier with an inventive method.

While the tubular carrier 1 can be produced in different ways by different forming processes, the inner high pressure process is especially suitable. As shown in FIG. 18, a tubular element 48 is located in a subdivided tool mold with a lower tool mold 39 and an upper tool mold 37. The tubular ends are closed by a sealing tool 40. A not shown press closes the tool mold. The tubular element 48 can be therefore deformed. It is also possible to use instead a pre-formed tubular element 48. This is especially advisable in the case of complex shapes.

Under a high pressure, pressure medium is pumped into the tubular element 48 through pressure medium conduits 41 in the sealing tool 40 so that the tubular element 48 abuts against the inner contour of the tool molds 39, 47 and flows into the hollow chambers 44 for the tubular members 3, 18, 21, 22, 23 and then flows out. Then, the tubular carrier is removed from the tool molds 39, 47. The shaped tubular members 3, 18, 21, 22, 23, are open, for example by cutting of the ends of the tubular members or by drilling or punching. A collar is produced in the peripheral direction of the tubular members 3, 18, 21, 22, 23, and it can be used as an axial limit or an axial abutment.

The tubular element 48 can be produced from various materials. It is especially suitable to use a zinc-plated steel tube with low hardness. However, also tubular elements 48 of an aluminum alloy are considered to be advantageous in view of their low weight and high corrosion resistance.

For obtaining a maximum uniform wall thickness, it is advantageous during the deformation of the tubular element 48 to displace the tube ends with the sealing tools 40 in direction of the arrow 42. Thereby the material for forming the tubular member 3 and 18 is not only taken from the wall thickness of the remaining tubular members 34, but also the shortening of the tubular element 48 is available. Furthermore, the deforming of the tubular member 3 and 18 by the mold plunger 48 is controlled, which is guided in passages 46 of the tool mold 39, 47 and act on the tube outer side in direction of the arrow 43. Thereby the height of the tubular member 3 and 18 can be determined.

It will be understood that each of the elements described above, or two or more together, may also find a useful application in other types of constructions and methods differing from the types described above.

While the invention has been illustrated and described as embodied in a tubular plate and a method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A tubular carrier for at least one wiper bearing and a wiper drive of a wiper device, the tubular carrier comprising a main part having opposite ends, tubular members provided at said opposite ends of said main part and each formed for receiving the at least one wiper bearing, said main part and said tubular member being formed of one piece with one another as a one piece tubular element.

2. A tubular plate as defined in claim 1; and further comprising a further tubular member formed of one piece with said main part for receiving a wiper drive.

3. A tubular plate as defined in claim 1, wherein said main part has a cross-section which deviates from a circular cross-section and has a polygonal cross-section.

4. A tubular plate as defined in claim 2, wherein said main part and said tubular members have a cross-section which is different from a circular cross-section and is a polygonal cross-section.

5. A tubular plate as defined in claim 1, wherein said main part has a spacially different cross-section.

6. A tubular plate as defined in claim 1, and further comprising mounting elements formed on said opposite ends of said main part.

7. A tubular plate as defined in claim 6, wherein said mounting elements are flat and provided with a hole.

8. A tubular plate as defined in claim 6, wherein said mounting elements are flat and provided with a slot.

9. A tubular plate as defined in claim 6, wherein said mounting elements have a U-shaped profile and are provided with a hole.

10. A tubular plate as defined in claim 6, wherein said mounting elements have a U-shaped profile and are provided with a slot.

11. A tubular plate as defined in claim 1; and further comprising an additional support connected with said main part.

12. A tubular plate as defined in claim 11, wherein said additional support is formed so that it is mountable on a wiper drive.

13. A tubular plate as defined in claim 1; and further comprising another tubular member connected with said main part.

14. A tubular plate as defined in claim 1, wherein said main part is curved in at least one plane.

15. A tubular plate as defined in claim 1, wherein said main part is curved in several planes.

16. A tubular carrier for at least one wiper bearing and a wiper drive of a wiper device, the tubular carrier comprising a main part having opposite ends, tubular members provided at said opposite ends of said main part and each formed for receiving the at least one wiper bearing, said main part and said tubular member being formed of one piece with one another as a one piece tubular element, by deformation of said one piece tubular element without removal of material of said one piece tubular element.

\* \* \* \* \*